UNITED STATES PATENT OFFICE.

BERNHARD HEYMANN, OF ELBERFELD, GERMANY, ASSIGNOR TO THE FARBENFABRIKEN, VORMALS FR. BAYER & CO., OF SAME PLACE.

BLUE DYE.

SPECIFICATION forming part of Letters Patent No. 524,323, dated August 14, 1894.

Application filed May 2, 1893. Serial No. 472,761. (Specimens.)

*To all whom it may concern:*

Be it known that I, BERNHARD HEYMANN, doctor of philosophy, and assignor to the FARBENFABRIKEN, VORMALS FR. BAYER & CO., of Elberfeld, residing at Elberfeld, Germany, have invented a new and useful Improvement in the Manufacture of Blue Coloring-Matters, of which I give in the following a clear and exact description.

My invention relates to the production of new blue coloring-matters dyeing cotton and wool with the aid of mordants, and resulting by the action of the nitroso compounds of alkylated benzylanilin sulfo acids on beta naphthoquinone sulfo acid (1:2:4) in the presence of sodium thiosulfate. However, it is not at all necessary for the above named process, to employ the complete quinone sulfo acid, but I can also directly proceed from the nitroso compound of alpha naphthol sulfo acid (1:4), from which nitroso compound the above named naphthoquinone sulfo acid can be obtained by reducing and subsequently oxidizing. Instead of the sulfo acid of nitroso-naphthol, nitrosonaphthol itself may be advantageously employed.

In carrying out my invention I proceed as follows: 15.3 kilos, by weight, of nitrosomethylbenzyl-anilin sulfo acid are dissolved in one thousand liters of water with the addition of 6.8 kilos, by weight, of crystallized sodium acetate and eighteen kilos, by weight, of diluted acetic acid (containing thirty-three per cent. of pure acetic acid). The solution is heated at about 80° centigrade and then, gradually with agitating the solution, 24.6 kilos, by weight, of sodium thiosulfate dissolved in fifty kilos, by weight, of water, are added. The reaction mixture is further heated at about 80° centigrade, until the yellow solution of the nitroso compound is no longer distinguishable viz., until the nitroso compound has entered into reaction. Then the thus obtained solution is mixed with 13.8 kilos, by weight, of the potassium salt of beta naphthoquinone sulfo acid (1:2:4). On continuous stirring and heating the reaction mixture the dye-stuff begins, after some time, to separate in the form of bright crystals with a metallic luster. The dye-stuff is filtered, washed and dried.

The same dye-stuff can be obtained, as above said, by replacing the 13.8 kilos, by weight, of the potassium salt of naphthoquinone sulfo acid by 8.7 kilos, by weight, of alpha nitroso beta naphthol or 12.7 kilos, by weight, of nitroso alpha naphthol monosulfo acid (1:2:4).

The thus obtained dye-stuff forms a dark powder with bronze luster. According to its qualities and to the analytical research the dye-stuff has probably the following formula:

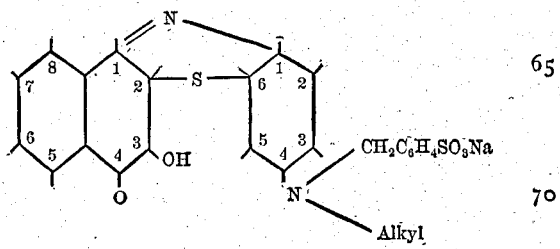

It dissolves in cold water with difficulty and with moderate facility in hot water (especially if acidulated with acetic acid) with a clear blue color, soluble in a little degree in cold and hot alcohol with a red violet color. With ammonia liquid it forms a blue solution. Concentrated mineral acids as for example hydrochloric acid (20° Baumé), sulfuric acid (66° Baumé) give a green solution turning into blue on the addition of water, while the free sulfo acid is separated in the form of blue flakes. Its hot watery solution mixed with ammonia or sodium carbonate assumes a dull blue color, and when mixed with hydrochloric acid or sulfuric acid, the free sulfo acid of the coloring-matter separates in blue flakes. It dyes wool and cotton mordanted with chromium salts in clear blue shades fast against light and milling.

If in the above example instead of nitrosomethylbenzylanilin sulfo acid, nitrosoethylbenzylanilin sulfo acid is employed, a similar dyestuff with the same properties is obtained.

Having thus described my invention, what I claim as new, and desire to secure by Letters Patent, is—

1. The process for the production of blue coloring-matters by the action of the nitroso compounds of alkylated benzylanilin sulfo acids on beta naphthoquinone sulfo acid (1:2:4) in the presence of sodium thiosulfate substantially as described.

2. As a new article of manufacture the coloring matter having probably the following formula:

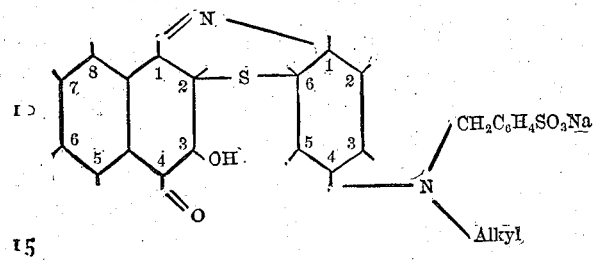

which coloring-matter forms a dark powder with bronze luster, soluble in cold water with difficulty and somewhat more easily soluble in hot water with a clear blue color, dissolving in concentrated mineral acids, as for example sulfuric acid (66° Baumé) and hydrochloric acid (20° Baumé), with a green color turning into blue on the addition of water, while the free sulfoacid is separated in blue flakes, dyeing on wool and cotton mordanted with chromium salts bright blue shades fast to light and milling.

In testimony whereof I have signed my name in the presence of two subscribing witnesses.

BERNHARD HEYMANN.

Witnesses:
WILLIAM ESSENWEIN,
RUDOLPH FRICKE.